United States Patent
Nishii et al.

(10) Patent No.: US 7,462,295 B2
(45) Date of Patent: Dec. 9, 2008

(54) 1,3,5-BENZENE TRICARBOXYLIC ACID COOLANT COMPOSITION

(75) Inventors: Mikito Nishii, Aichi (JP); Hiroyuki Arai, Toyota (JP); Sadayoshi Suzuki, Shizuoka (JP); Hideyuki Tami, Shizuoka (JP); Shigehiko Sato, Shizuoka (JP)

(73) Assignees: Toyota Jidosha Kabushiki Kaisha, Toyota (JP); Japan Chemical Industries Co., Shizuoka (JP)

(*) Notice: Subject to any disclaimer, the term of this patent is extended or adjusted under 35 U.S.C. 154(b) by 0 days.

(21) Appl. No.: 11/130,105

(22) Filed: May 17, 2005

(65) Prior Publication Data

US 2005/0274925 A1 Dec. 15, 2005

(30) Foreign Application Priority Data

May 17, 2004 (JP) ............................. 2004-146597

(51) Int. Cl.
*C09K 7/00* (2006.01)
(52) U.S. Cl. ............................. 252/71; 252/73; 252/75; 252/77
(58) Field of Classification Search ........................ None
See application file for complete search history.

(56) References Cited

U.S. PATENT DOCUMENTS

| 5,000,866 A | | 3/1991 | Woyciesjes |
| 5,080,818 A | * | 1/1992 | Tachiiwa et al. ............. 252/75 |
| 5,100,571 A | | 3/1992 | Hartman |
| 5,387,360 A | | 2/1995 | Uekusa et al. |
| 6,398,984 B1 | * | 6/2002 | Maes et al. ................ 252/387 |
| 2004/0119044 A1 | * | 6/2004 | Wenderoth et al. ............ 252/71 |

FOREIGN PATENT DOCUMENTS

| DE | 102 35 477 A1 | 2/2004 |
| EP | 0 995 785 A1 | 4/2000 |
| WO | WO 00/22189 | 4/2000 |
| WO | WO 2004/050785 A2 | 6/2004 |

OTHER PUBLICATIONS

European Search Report for 05010503.0-1218 mailed Mar. 27, 2007.

* cited by examiner

*Primary Examiner*—Necholus Ogden, Jr.
(74) *Attorney, Agent, or Firm*—Finnegan Henderson Farabow Garrett & Dunner LLP

(57) ABSTRACT

A coolant composition having anticorrosion properties against both aluminum and magnesium is provided. A coolant composition comprises a melting point depression agent selected from glycols and alcohols as the main component, and it contains a corrosion inhibitor selected from fluorides and a tribasic acid of an organic carboxylic acid or an alkali metal salt thereof.

11 Claims, No Drawings

1,3,5-BENZENE TRICARBOXYLIC ACID COOLANT COMPOSITION

TECHNICAL FIELD

The present invention relates to a coolant composition added to the cooling water of an internal combustion engine such as automobiles. Specifically, it relates to a coolant composition which has anticorrosion properties against metals.

BACKGROUND ART

Conventionally, a coolant of which the main component is a melting point depression agent such as alcohols and glycols is added to the cooling water of an automobile engine to prevent the cooling water from freezing in winter. However, the alcohols and glycols not only have no antirust effect, but also are oxidized by contact with oxygen while circulating at high temperatures, and problems arise that the generated oxides promote corrosion of the metallic materials which comprise the cooling water passage.

Then, in general, a rust-prevention agent selected from a group of phosphates, borates, carbonates, sulfates, nitrates, molybdates, benzoates, silicates, benzotriazole, mercaptobenzothiazole sodium salt, tolyltriazole, and triethanolamine salts, etc. is added to the coolant to prevent the metallic corrosion while using it by mixing a predetermined amount into the cooling water.

Since a variety of metallic materials such as cast irons, steels, and copper alloys are used for the cooling system of an internal combustion engine such as automobiles, it is a requirement of the coolant to prevent corrosion regardless of the kind of metal. However, accompanying the extensive use of aluminum parts for the purpose of resource and energy conservation, it becomes obvious that a conventional coolant has insufficient anticorrosion properties against aluminum system metals.

For instance, borates have excellent anticorrosion properties against cast iron materials, but are corrosive against aluminum system metallic materials. Moreover, triethanolamine has anticorrosion properties against both iron system and aluminum system metallic materials. However, when amine exists together with a nitrite, there is a possibility that they react to generate toxic nitrosamine. Furthermore, an amine salt has a problem that the anticorrosion properties against iron decrease rapidly due to deterioration.

In addition, there has been a movement to discuss the adoption of parts made of magnesium alloys for the cooling system for the purpose of both resource and energy conservation. However, magnesium has the lowest standard electrode potential and low corrosion resistance in practical metallic materials, so that it is necessary to consider the corrosion resistance in a practical use. Improvement in the corrosion resistance is considered to be achieved by the cooling water used for the cooling system as well as by improving the corrosion resistance of the magnesium alloy itself. However, a conventional coolant additive cannot prevent magnesium from corrosion.

As a coolant which can prevent magnesium from corrosion, WO00/22189 discloses corrosion inhibitor compounds including a) 0.1 to 15 wt % of one or more inhibitors selected from a group of alkylbenzoic acids, $C_5$ to $C_{15}$ monobasic acids and $C_5$ to $C_{15}$ dibasic acids, and salts thereof, b) 0.005 to 5 wt % of fluorides and/or fluorocarboxylic acids and salts thereof.

However, it has been a problem that fluorides have excellent anticorrosion properties against magnesium but have adverse effects on aluminum alloys.

DISCLOSURE OF THE INVENTION

That is, the problems are that the fluorides have adverse effects on aluminum, and the coolant compound using alkylbenzoic acids, $C_5$ to $C_{15}$ monobasic acids, or $C_5$ to $C_{15}$ dibasic acids disclosed in the aforementioned patent document 1 could prevent the adverse effects of fluorides but had weak anticorrosion properties against aluminum.

It is an object of the present invention to provide a coolant compound which solves the aforementioned problems of the prior art, which has both aluminum anticorrosion and magnesium anticorrosion properties.

The inventors of the present invention found that the aforementioned problems are solved by using a specific compound together with a fluoride as a corrosion inhibitor.

That is, a coolant compound of the present invention comprises a melting point depression agent selected from glycols and alcohols as the main component, and contains a corrosion inhibitor selected from fluorides and a tribasic acid of an organic carboxylic acid or an alkali metal salt thereof.

From the viewpoint of the anticorrosion properties against metals and the solubility, one or more selected from a group of aliphatic and aromatic tribasic acids having a carbon number of 6 to 20 and the alkali metal salts thereof are preferable for the tribasic acid of the organic carboxylic acid or the alkali metal salt thereof. Specifically, 1,3,5-benzene tricarboxylic acid or alkali metal salts thereof is shown as a preferable example.

A water-soluble fluoride is preferable for the fluoride. Concretely, one or more selected from a group of sodium fluoride, potassium fluoride, and ammonium fluoride is shown as a preferable example.

In a coolant compound of the present invention, the addition of the tribasic acid of the organic carboxylic acid or the alkali metal salt thereof is selected suitably within boundaries where its effectiveness is demonstrated. For instance, based on the 100 wt % of the compound, it is preferable that the fluoride be present in the compound from 0.01 to 2 wt % equivalent to the fluorine element, and that the tribasic acid of the organic carboxylic acid or the alkali metal salt thereof be present from 2 to 8 wt %.

A well-known additive may be added as well as the fluoride and the tribasic acid of the organic carboxylic acid or the alkali metal salt thereof in a coolant composition of the present invention. Concretely, it is preferable that one or more selected from a group of 0.01 to 1.0 wt % of nitrates, 0.05 to 1.0 wt % of triazoles, 0.01 to 1.0 wt % of thiazoles, 0.01 to 0.5 wt % of phosphoric acid or alkali metal salt thereof equivalent to metallic phosphorus, 0.01 to 1.0 wt % of molybdates based on the 100 wt % of the compound.

A coolant composition of the present invention has both aluminum anticorrosion and magnesium anticorrosion properties. When it is used for an automobile, etc. which uses a light material such as the aluminum alloys and the magnesium alloys for the engine and the cooling system, it works for a coolant composition to have both aluminum anticorrosion and magnesium anticorrosion properties.

BEST MODE FOR CARRYING OUT THE INVENTION

A melting point depression agent which is a main component of a coolant composition of the present invention is one which is conventionally well-known. As alcohols and glycols for the melting point depression agent, methanol, ethanol, 2-propanol, mono-ethylene glycol, and propylene glycol may be used alone or as a blend of two or more.

From the viewpoint of anticorrosion properties against metals and the solubility, one or more selected from a group of aliphatic and aromatic tribasic acids having a carbon number of 6 to 20 and the alkali metal salts thereof is preferable for the tribasic acid of the organic carboxylic acid or the alkali metal salt thereof, added to a coolant composition of the present invention. Concretely, 1,3,5-benzene tricarboxylic acid, 1,2,4-benzene tricarboxylic acid (trimellitic acid), 2,5,7-naphthalene tricarboxylic acid, 1,2,4-naphthalene tricarboxylic acid, aromatic carboxylic acid such as pyromellitic acid, etc., 1,2,4-butane tricarboxylic acid, 1,2,5-hexane tricarboxylic acid, 1,3-dicarboxylic-2-methyl-methylene carboxylpropane, tetra (methylene carboxyl) methane, aliphatic carboxylic acid such as 1,2,7,8-octane tetracarboxylic acid, etc., alicyclic carboxylic acid such as 1,2,4-cyclohexane tricarboxylic acid, etc., and alkali metal salts thereof are provided as the trivalent carboxylic acid compounds. Specifically, 1,3,5-benzene tricarboxylic acid or alkali metal salts thereof is shown as a preferable example among them.

A water-soluble fluoride is preferable for a fluoride added to a coolant compound of the present invention. Concretely, hydrogen fluoride, fluorocarboxylic acid, and alkali metal acids, ammonium salts, or a water-soluble amine salts thereof are provided. Sodium fluoride, potassium fluoride, and ammonium fluoride are shown as a preferable example among them, from the viewpoint of work efficiency and anticorrosive effects.

Although the additive effects of the fluoride can be recognized when the blended amount of fluoride is less than 0.01 wt % of fluoride, the weight losses of the aluminum alloys and the magnesium alloys are large. On the other hand, when it is added in excess of 2 wt %, a saturation phenomenon appears in the additive effects of the fluoride, so that the preferable blended amount of fluoride is 0.01 to 2 wt %.

When at least one of the tribasic acids of the organic carboxylic acid or the alkali metal salts thereof is less than 2 wt %, the anticorrosion properties become insufficient against aluminum alloys, cast irons, and steels. When it exceeds 8 wt %, a saturation phenomenon appears in the additive effects and the cost increases, so that the preferable blended amount of the tribasic acids of the organic carboxylic acid and the alkali metal salts thereof is 2 to 8 wt %.

Moreover, it is preferable that 0.01 wt % of nitrates, 0.05 to 1.0 wt % of triazoles, and 0.01 to 1.0 wt % of thiazoles are contained in a coolant compound of the present invention. As a result, the anticorrosion properties are improved further. The nitrates prevent aluminum from pitting corrosion and the triazoles and thiazoles are effective in the anticorrosion of copper. They may be used alone, and using three of these is more preferable. Sodium nitrate and potassium nitrate are shown as the preferable example of the nitrates, and benzotriazole and tolyltriazole are shown as the preferable examples of the thiazoles. Moreover, as the thiazoles, benzothiazole and sodium mercaptobenzothiazole are shown as the preferable examples.

Furthermore, it is preferable that a coolant compound of the present invention does not include amine salts, borates, and nitrites.

A coolant composition of the present invention is typically used blended 20 to 60 vol % in cooling water. Therefore, it is necessary that each element of the additives of a coolant composition of the present invention be completely soluble in water at least when it is used, so that it is preferable that an element having poor solubility is blended as an alkali metal salt which is soluble in water. Sodium salts and potassium salts are shown as the preferable examples of alkali metal salts. Moreover, from the viewpoint of storage stability and handling properties, it is preferable that each element has dissolved completely in the state of the undiluted solution of the coolant composition. Therefore, it is preferable that the pH be adjusted optimally, along with improving the solubility by further adding sodium hydroxide and potassium hydroxide in a coolant compound of the present invention.

EXAMPLES

The following is a concrete description of the present invention with reference to the accompanying examples and comparative examples. The following % means the weight % unless specifically noted.

Example 1 and Comparative Example 1

The coolant compositions of embodiment 1 and comparison example I were made by the blended amount shown in the Table 1 mentioned below. Herein, 1,3,5-benzene tricarboxylic acid (example 1) which is a tribasic acid of an organic carboxylic acid and sebacic acid (1,8-octane dicarboxylic acid: comparative example 1) which is used as an example in the aforementioned patent document 1 are used.

TABLE 1

|  | Example 1 | Comparative Example 1 |
|---|---|---|
| KF (F conversion) | 0.6 | 0.6 |
| Sebacic acid | — | 4.2 |
| 1,3,5-benzene tricarboxylic acid | 4.4 | — |
| Phosphoric acid | 0.06 | 0.06 |
| Benzotriazole | 0.3 | 0.3 |
| Mercaptobenzothiazole sodium salt | 0.3 | 0.3 |
| Sodium nitrate | 0.3 | 0.3 |
| pH (ion exchange water 50% dilution) | 7.6 | 7.6 |

Passive state current density measurements of the AC2A aluminum alloy were carried out using the aforementioned coolant composition diluted in 50% JIS mixing water under the condition in which the liquid temperature is 88° C., the sweep rate 20 mV/min, and the aeration with nitrogen. Corrosion tests against metals while contacting with a magnesium alloy and an aluminum alloy were carried out by using the manner of AZ91D-AC2A contact corrosion test. The tests were performed in 50 vol % diluted JIS water at 90° C. for 300 hours in conformity to the JISK2234 metal corrosion test. The results are shown in Table 2.

TABLE 2

|  | Passive state current density ($\mu A/cm^2$) | Metal corrosion test Mass change ($mg/cm^2$) | |
|---|---|---|---|
|  | AC2A | AZ91D | AC2A |
| Example 1 | 12 | −0.10 | −0.06 |
| Comparative Example 1 | 13 | −0.13 | −0.17 |

According to the results shown in Table 2, the passive state current density of the example 1 (12 $\mu A/cm^2$) using a tribasic acid of an organic carboxylic acid is smaller than that of the comparative example (13 $\mu A/cm^2$) using a dibasic acid of organic carboxylic acid, so that it can be said that the example 1 has a lower corrosion rate against the aluminum alloy and has better anticorrosion properties against the aluminum alloy compared with the comparative example 1. Moreover, both the example 1 and the comparative example 1 have a similar weight loss of the magnesium alloy and have similar anticorrosion properties against the magnesium alloy. The example 1 has a lower weight loss of the aluminum casting compared with the comparative example 1, which means that it has better anticorrosion properties against aluminum.

According to the results, it is understood that using both the fluorides and tribasic acids of an organic acid together in a coolant composition of the present invention achieved both anticorrosion of magnesium alloys and aluminum alloys.

Examples 2 to 6

The mass changes of the coolant composition having the blended amount shown in Table 3 were investigated in the same manner as the example 1.

TABLE 3

| | | Example 2 | Example 3 | Example 4 | Example 5 | Example 6 |
|---|---|---|---|---|---|---|
| Blended amount weight % | KF (F conversion) | 0.008 | 0.05 | 1 | 2 | 2.5 |
| | 1,3,5-benzene tricarboxylic acid | 4.4 | ← | ← | ← | ← |
| | Phosphoric acid | 0.06 | ← | ← | ← | ← |
| | Benzotoriazorle | 0.3 | ← | ← | ← | ← |
| | Mercaptobenzothiazole sodium salt | 0.3 | ← | ← | ← | ← |
| | Sodium nitrate | 0.3 | ← | ← | ← | ← |
| pH (ion exchange water 50% dilution) | | 7.6 | ← | ← | ← | ← |
| Mass change mg/cm$^2$ | AZ91D | −0.40 | −0.12 | −0.11 | −0.08 | −0.08 |
| | AC2A | −0.04 | −0.03 | −0.13 | −0.16 | −0.22 |

According to the results shown in Table 3, it is understood that the preferable blended amount of fluoride is 0.01 to 2 wt %, since the additive effects of the fluoride can be recognized when the blended amount of fluoride is 0.008 wt % of fluoride but the weight loss is great, and saturation appears in the additive effects of fluoride when it is added in excess of 2 wt %.

Examples 7 to 11

The mass changes of the coolant composition having the blended amount shown in Table 4 were investigated in the same manner as the example 1.

According to the results shown in Table 4, it is understood that the preferable blended amount of 1,3,5-benzene tricarboxylic acid and the metal salt thereof is 2 to 8 wt %, since the anticorrosion properties against the aluminum alloy is insufficient when the blended amount of 1,3,5-benzene tricarboxylic acid and the alkali metal salt thereof is less than 2%, and saturation appears in the addition effects and the cost rises when it is added exceeding 8 wt %.

INDUSTRIAL APPLICABILITY

A coolant compound which achieved both anticorrosion of magnesium alloys and anticorrosion of aluminum alloys could be obtained by adding both a fluoride and a tribasic acid of an organic acid or an alkali metal acid thereof together in the coolant composition. According to this coolant composition, it becomes possible to promote the lightening of automobiles, etc.

What is claimed is:

1. A coolant composition comprising:
    a melting point depression agent including at least glycols or alcohols; and
    a corrosion inhibitor including a water-soluble fluoride and an organic carboxylic acid consisting essentially of 1,3,5-benzene tricarboxylic acid or an alkali metal salt thereof but not including amine salts, borates, and nitrites,
    wherein the amount of 1,3,5-benzene tricarboxylic acid from 2 to 8 wt% based on the 100 wt% of the composition.

TABLE 4

| | | Example 7 | Example 8 | Example 9 | Example 10 | Example 11 |
|---|---|---|---|---|---|---|
| Blended amount weight % | KF (F conversion) | 0.6 | ← | ← | ← | ← |
| | 1,3,5-benzene tricarboxylic acid | 1 | 2 | 3 | 6 | 8 |
| | Phosphoric acid | 0.06 | ← | ← | ← | ← |
| | Benzotoriazorle | 0.3 | ← | ← | ← | ← |
| | Mercaptobenzothiazole sodium salt | 0.3 | ← | ← | ← | ← |
| | Sodium nitrate | 0.3 | ← | ← | ← | ← |
| pH (ion exchange water 50% dilution) | | 7.6 | ← | ← | ← | ← |
| Mass change mg/cm$^2$ | AZ91D | −0.21 | −0.13 | −0.09 | −0.06 | −0.06 |
| | AC2A | −0.98 | −0.08 | −0.09 | −0.07 | −0.08 |

2. A coolant composition comprising:
a melting point depression agent including at least glycols or alcohols; and
a corrosion inhibitor including a water-soluble fluoride and 1,3,5-benzene tricarboxylic acid or an alkali metal salt thereof but not including amine salts, borates and nitrites,
wherein the amount of 1,3,5-benzene tricarboxylic acid from 2 to 8 wt% based on the 100 wt% of the composition.

3. A coolant composition according to claim 1, wherein said fluoride is one or more selected from a group of sodium fluoride, potassium fluoride, and ammonium fluoride.

4. A coolant composition according to claim 1, wherein said fluoride is present in the composition from 0.01 to 2 wt% equivalent to the fluorine element based on the 100 wt% of the composition.

5. A coolant composition according to claim 1, further comprising: one or more selected from a group of 0.01 to 1.0 wt% of nitrates, 0.05 to 1.0 wt% of triazoles, 0.01 to 1.0 wt% of thiazoles, 0.01 to 0.5 wt% of phosphoric acid or alkali metal salts thereof, in an amount equivalent to 0.01 to 0.5 wt% of metallic phosphorous, and 0.01 to 1.0 wt% of molybdates based on the 100 wt% of the composition.

6. A coolant composition comprising:
a melting point depression agent includes glycols and alcohols; and
a corrosion inhibitor includes a water-soluble fluoride and an organic carboxylic acid consisting essentially of 1,3,5-benzene tricarboxylic acid or an alkali metal salt thereof but not including amine salts, borates, and nitrites,
wherein said fluoride is present in the composition from 0.01 to 2 wt% equivalent to the fluorine element based on the 100 wt% of the composition and wherein the amount of 1,3,5-benzene tricarboxytic acid ranges from 2 to 8 wt% based on the 100 wt% of the composition.

7. A coolant composition according to claim 6, wherein said fluoride is one or more selected from a group of sodium fluoride, potassium fluoride, and ammonium fluoride.

8. A coolant composition according to claim 6, further comprising: one or more selected from a group of 0.01 to 1.0 wt% of nitrates, 0.05 to 1.0 wt% of triazoles, 0.01 to 1.0 wt% of thiazoles, 0.01 to 0.5 wt% of phosphoric acid or alkali metal salts thereof in an amount equivalent to 0.01 to 0.5 wt% metallic phosphorous, and 0.01 to 1.0 wt% of molybdates based on the 100 wt% of the composition.

9. A coolant composition according to claim 2, wherein said fluoride is one or more selected from a group of sodium fluoride, potassium fluoride, and ammonium fluoride.

10. A coolant composition according to claim 2, wherein said fluoride is present in the composition from 0.01 to 2 wt% equivalent to the fluorine element based on the 100 wt% of the composition.

11. A coolant composition according to claim 2, further comprising: one or more selected from a group of 0.01 to 1.0 wt% of nitrates, 0.05 to 1.0 wt% of triazoles, 0.01 to 1.0 wt% of thiazoles, 0.01 to 0.5 wt% of phosphoric acid or alkali metal salts thereof, in an amount equivalent to 0.01 to 0.6 wt% of metallic phosphorous, and 0.01 to 1.0 wt% of molybdates based on the 100 wt% of the composition.

* * * * *

UNITED STATES PATENT AND TRADEMARK OFFICE
CERTIFICATE OF CORRECTION

PATENT NO. : 7,462,295 B2  
APPLICATION NO. : 11/130105  
DATED : December 9, 2008  
INVENTOR(S) : Mikito Nishii et al.

It is certified that error appears in the above-identified patent and that said Letters Patent is hereby corrected as shown below:

Title page, item (73) Assignees should read as follows: Toyota Jidosha Kabushiki Kaisha, Toyota (JP); Japan Chemical Industries Co., Ltd., Shizuoka (JP)

In column 7, line 9, claim 2 should read:  
...tricarboxylic acid ranges from 2 to 8 wt% based on...

In column 8, line 27, claim 11 should read:  
...amount equivalent to 0.01 to 0.6 0.5wt% of metallic phosphorous...

Signed and Sealed this

Ninth Day of March, 2010

David J. Kappos  
*Director of the United States Patent and Trademark Office*